No. 795,876. PATENTED AUG. 1, 1905.
M. H. WILLHIDE.
NAIL PULLER.
APPLICATION FILED JUNE 1, 1903.
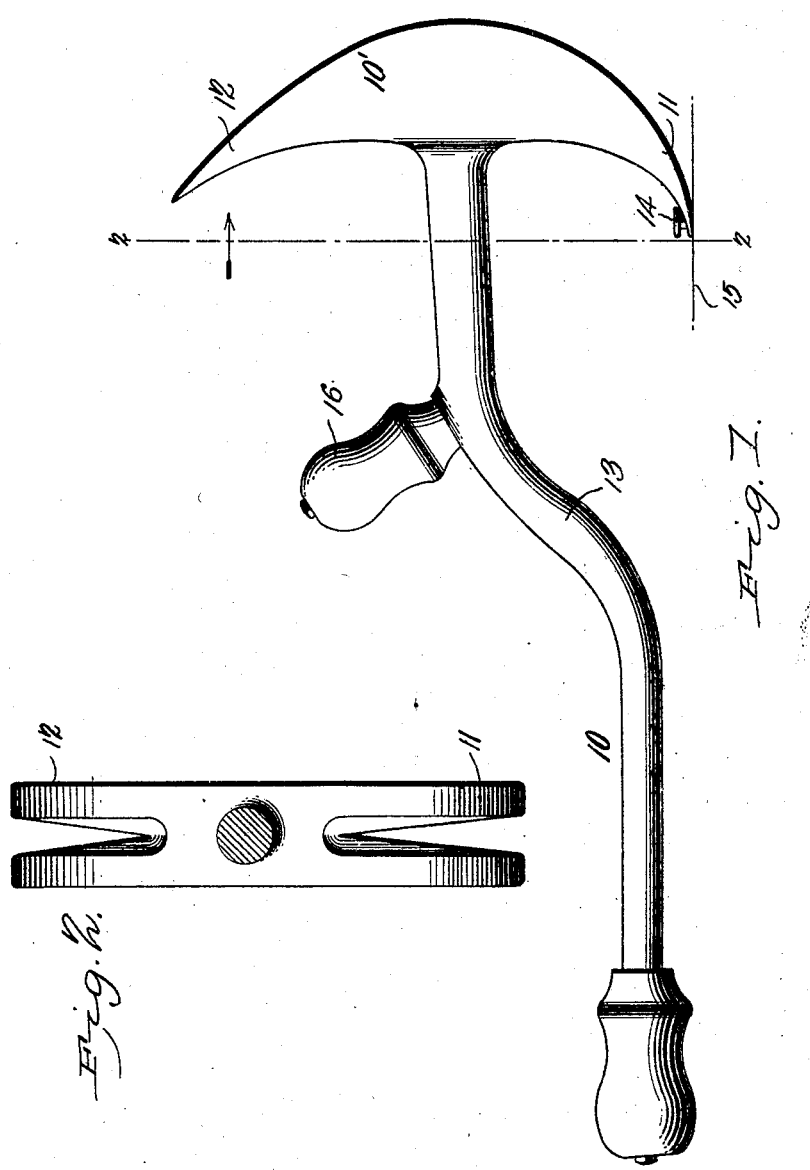

UNITED STATES PATENT OFFICE.

MARTIN H. WILLHIDE, OF INGALLS, INDIANA.

NAIL-PULLER.

No. 795,876.      Specification of Letters Patent.      Patented Aug. 1, 1905.

Application filed June 1, 1903. Serial No. 159,638.

*To all whom it may concern:*

Be it known that I, MARTIN H. WILLHIDE, a citizen of the United States, residing at Ingalls, in the county of Madison and State of Indiana, have invented a new and useful Nail-Puller, of which the following is a specification.

This invention relates to implements employed for pulling nails, and has for its object to produce a simply-constructed and convenient implement whereby nails of different lengths may be drawn without bending or otherwise injuring them or the structure from which they are drawn; and the invention consists in certain novel features of construction, as hereinafter shown and described, and specified in the claims.

In the drawings illustrative of the invention, in which corresponding parts are denoted by like designating characters, Figure 1 is a side view of the implement applied. Fig. 2 is a transverse section on the line 2 2 of Fig. 1 looking in the direction of the arrow.

The improved implement comprises a shank or stock 10, having oppositely-disposed laterally-extending claws 11 12 of the usual form employed upon hammers, the claw 12 being of a relatively longer curve than the claw 11, as shown. The claws and stock will preferably be integral and forged from properly-tempered steel. The stock 10 will be bent intermediately, as at 13, with the free end extended into alinement longitudinally with the extremity of the claw 11, having the shorter curve, as shown, so that when the claw 11 is placed beneath the head of the nail 14, as shown in Fig. 1, the outer portion of the stock will lie parallel to the structure 15, from which the nail is to be drawn. When in this position, the draft or force required to first engage the claw with the nail is in a direct line with the structure and at right angles to the nail and enables the operator to utilize the force upon the claw to a much better advantage and with a correspondingly better effect. To assist in this action, a supplemental handle 16 is formed, extending from the stock 10 intermediately of its length and at the side which projects centrally from the head 10', the supplemental handle providing means whereby a strong lateral and drawing pressure may be exerted upon the claw 11 to force it beneath the nail-head. The stock and handle members thus coact to greatly expedite the action and decrease the labor and time required to "start" the nail from the wood, and after the nail is partially drawn the implement is reversed and the claw 12 brought into action, which by reason of its longer curve exerts a longer leverage and completes the drawing of the nail without bending it. Thus the longest nails may be readily and quickly drawn and without bending them or injuring the structures from which they are drawn by reason of the differential fulcrum afforded by the claws of different curvature.

The implement will preferably be formed in one single piece of steel, except the finish of the handle, which may be of wood or other material suitably connected.

An implement thus constructed will be found very useful and efficient for the purposes designed and may be manufactured in various sizes.

Having thus described the invention, what I claim is—

1. A nail-puller comprising a head provided at each end with claws, a shank extending centrally from said head and having an offset intermediate portion to dispose its free end in longitudinal alinement with one of the claws.

2. A nail-puller comprising a handle member having claws extending laterally therefrom in opposite directions, with their inner faces disposed approximately at right angles to said handle, one of said claws being of greater curvature than the other and having its free end disposed nearer the handle member than the free end of the other claw and terminating in a plane therebelow.

3. As a new article of manufacture, a nail-puller comprising a primary handle member having oppositely-extending claws of different external curves and with the free end of said handle disposed in longitudinal alinement with the extremity of the claw having the shorter curve, and a supplemental handle extending from said primary handle intermediately thereof on the side contiguous to the claw having the longer curve, substantially as specified.

4. As a new article of manufacture, a nail-puller comprising a primary handle member having a laterally-extended claw with the free end of the handle disposed in longitudinal alinement with the extremity of the claw, and a supplemental handle extending from the side of said primary handle opposite to said claw, substantially as specified.

In testimony that I claim the foregoing as my own I have hereto affixed my signature in the presence of two witnesses.

MARTIN H. WILLHIDE.

Witnesses:
E. C. RUMMELL,
E. C. TALLEY.